(12) United States Patent
Klaiber et al.

(10) Patent No.: US 8,061,502 B2
(45) Date of Patent: Nov. 22, 2011

(54) DEVICE AND METHOD FOR DISCHARGING ELONGATE, COARSE BULK PRODUCTS AND FOR THEIR FURTHER TRANSPORT

(75) Inventors: Franz Klaiber, Wehingen (DE); Peter Novak, Tagerwiten (CH)

(73) Assignee: Sidel Participations S.A.S, Octeville-sur-Mer (FR)

( * ) Notice: Subject to any disclaimer, the term of this patent is extended or adjusted under 35 U.S.C. 154(b) by 193 days.

(21) Appl. No.: 12/377,570

(22) PCT Filed: Aug. 15, 2007

(86) PCT No.: PCT/EP2007/007201
§ 371 (c)(1),
(2), (4) Date: Jul. 7, 2009

(87) PCT Pub. No.: WO2008/019836
PCT Pub. Date: Feb. 21, 2008

(65) Prior Publication Data
US 2010/0006588 A1  Jan. 14, 2010

(30) Foreign Application Priority Data

Aug. 15, 2006 (DE) .................. 10 2006 038 321
Nov. 24, 2006 (DE) .................. 10 2006 055 962

(51) Int. Cl.
B65G 47/24 (2006.01)
(52) U.S. Cl. ...................... 198/396; 198/392

(58) Field of Classification Search .............. 198/392, 198/396, 443
See application file for complete search history.

(56) References Cited

U.S. PATENT DOCUMENTS

| 3,575,276 | A | | 4/1971 | Rupert | |
| 5,415,322 | A | * | 5/1995 | Sala | 198/392 |
| 6,267,223 | B1 | * | 7/2001 | Nakagawa et al. | 198/396 |
| 6,302,258 | B1 | * | 10/2001 | Verona | 198/392 |
| 6,513,644 | B1 | * | 2/2003 | Takahashi et al. | 198/396 |
| 7,293,656 | B2 | * | 11/2007 | Shendge | 198/396 |
| 7,861,848 | B2 | * | 1/2011 | Monti | 198/443 |

FOREIGN PATENT DOCUMENTS

| DE | 1953974 U | 1/1967 |
| DE | 3626734 A1 | 2/1988 |
| EP | 0093015 A | 11/1983 |
| WO | WO2006084831 A | 8/2006 |
| WO | WO2007028627 A | 3/2007 |

OTHER PUBLICATIONS

International Search Report; European Patent Office; for PCT/EP2007/007201; mailed Apr. 17, 2008.

* cited by examiner

Primary Examiner — James R Bidwell
(74) Attorney, Agent, or Firm — Bachman & LaPointe, P.C.

(57) ABSTRACT

A device is disclosed for discharging elongate, coarse bulk products—such as bottle preforms—from a product hopper. The device includes a product hopper with a discharge opening and a rotating disc that is configured to receive bulk products passing through the discharge opening.

26 Claims, 18 Drawing Sheets

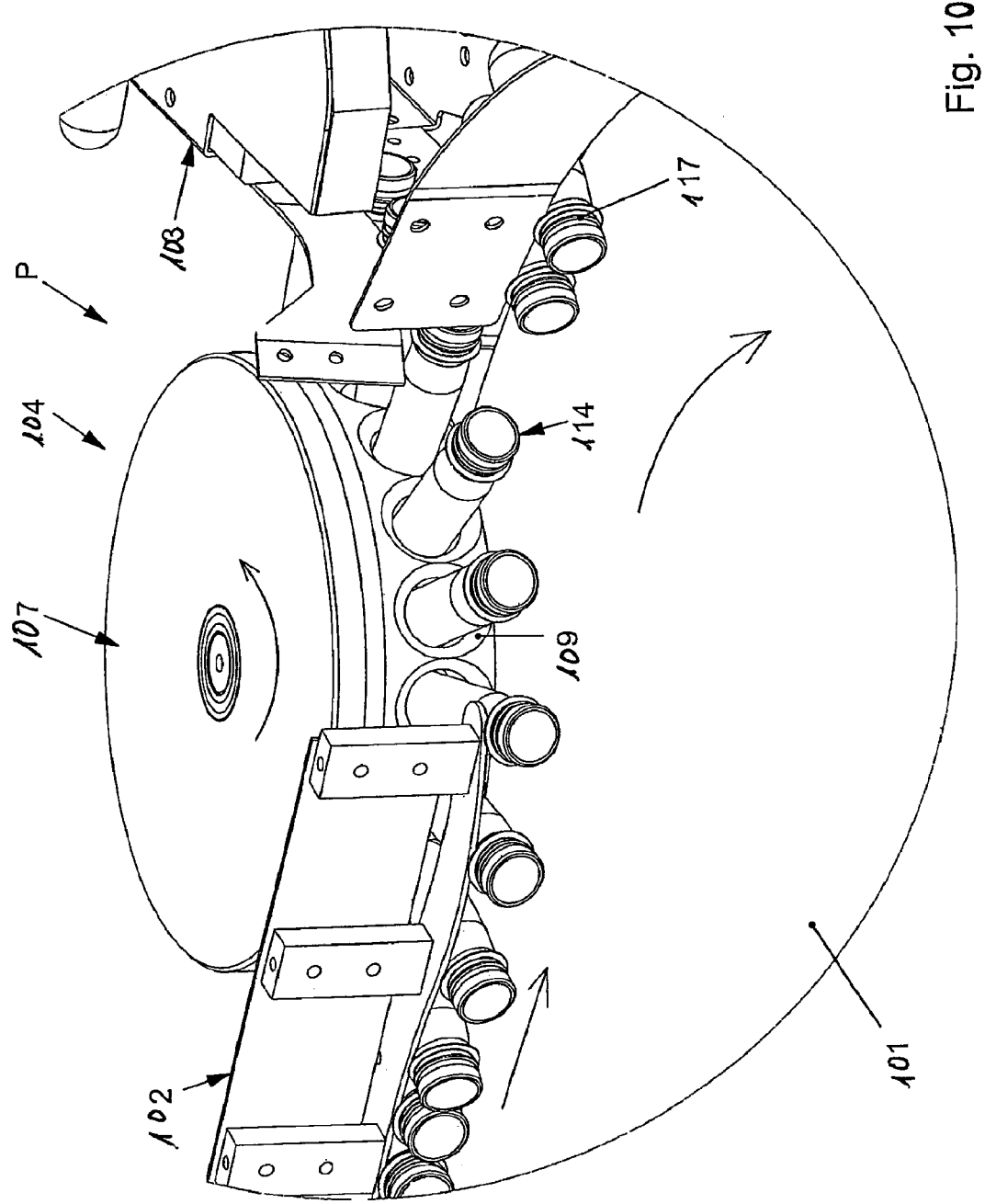

DEVICE AND METHOD FOR DISCHARGING ELONGATE, COARSE BULK PRODUCTS AND FOR THEIR FURTHER TRANSPORT

REFERENCE TO RELATED APPLICATIONS

This application claims the benefit of National stage application (under 35 U.S.C. 371) of PCT/EP/2007/007201, filed Aug. 15, 2007, which claims the benefit to German Application No. 102006038321.4, dated Aug. 15, 2006, and German Application No. 102006055962.2, dated Nov. 24, 2006.

The invention relates to a device for discharging elongate, coarse bulk products from a container, in particular PET bottle preforms from a bulk product hopper having a discharge opening, as well as methods and devices for further transport.

PRIOR ART

Many products are frequently temporarily stored situated in large containers before they are processed or treated further. This is true, for example, for cops in the textile industry but particularly also for PET preforms, as are necessary for producing plastic bottles in the blowmolding method. Corresponding containers are used for storing the products, in particular the preforms, or for supplying them to further processing machines. Many of these containers have recurring design features and are implemented as bulk product hoppers. From top to bottom, these bulk product hoppers have a large cross-section and a conical transition to a small cross-section as well as an exit opening.

The products to be discharged and in particular the preforms are usually elongate and thus have a bulky shape which is disadvantageous for the discharge. This frequently results in problems during the emptying of the container, because the preforms wedge with one another in such a way that they do not descend and/or they form bridges. Or, avalanche-like exits occur, because too many products exit at once through the discharge opening. The controlled discharge and the dosing are thus large problems it in the relay of stored preforms, in particular if the cross-sectional area of the discharge opening is smaller than the large cross-section of the container.

The present invention relates above all to the production of PET bottles, preforms being produced in a precursor method in an injection molding machine, which are then inflated to form PET bottles in a blowing machine. This PET industry is a high-technology area of activity of the packaging industry. In complex steps, PET bottles arise in all possible shapes, sizes, and colors. The preforms and/or PET bottles must be transported back and forth and possibly treated between the individual processing stations. A part of a facility of this type is described, for example, in PCT/EP2006/008772. The transport of the hollow cylindrical objects is performed by arbitrary transport units, such as guide strips, belts, carriages, rails, etc. For example, if a malfunction occurs in a processing station, significant jams may occur. In this case, up to this point the objects have been conducted out of the cycle via a switch or the like and buffered in a buffer. This is complex and time-consuming.

OBJECT

The object of the present invention is the provision of devices and methods of the above-mentioned type, which allow a simply acting, rapidly varying dosing and relay or blocking of the product stream which is sparing in quantity. It is to ensure a greater contribution to the improvement of the transport of preforms and PET bottles between the individual processing stations and the entire facility is to be adapted to the increased market demands for higher availability of the object.

ACHIEVEMENT OF THE OBJECT

The object is achieved in that the discharge opening is assigned a rotating disc.

The rotating disc signifies an active element, using which the products and in particular the preforms may be discharged from the container. It is preferably a speed-controlled rotating disc on which superstructures are situated in the radial direction, which ensure the discharge. The possibility of changing the speed of the rotating disc also opens up the possibility of precisely controlling the quantity of preforms to be discharged. If the disc is shifted into higher speeds, the discharge quantity also increases. If the disc is stopped, no preforms are discharged, the discharge opening is blocked.

The superstructures on the surface of the disc cause preforms to be more or less combed out of the discharge opening. It has proven to be advisable for this purpose to situate the superstructures eccentrically, by which guiding of the preforms outward is improved. These superstructures may be wall strips, for example, which are implemented as radially linear or curved. Upon the selection of a curvature, it is to be ensured that it is implemented as trailing in the rotational direction, by which a radial conveyance of the preforms is supported.

A further feature of the present invention is that an opening width of an annular opening is preferably changeable in a round or polygonal way between the discharge opening and disc. In this way, different shapes of products to be discharged may be taken into consideration. The thicker and/or longer the product to be discharged, the larger is the opening width to be. In a simple exemplary embodiment, this is ensured by a screen which is situated so it is displaceable on a connecting piece, this connecting piece simultaneously also implementing and/or surrounding the discharge opening.

A distributing surface is preferably provided below the disc, by which the products and in particular the preforms may be isolated. A device of this type is described, for example, in PCT/EP2006/050682, to which reference is made in particular.

In practice, it has been shown that a softly rotating dynamic column made of preforms is generated by the rotating disc, which propagates up into the interior of the container and ensures that the preforms descend. It is additionally provided here that a stirring finger, such as a twisted stirring rod, is also connected to the rotating disc, which engages in the container through the discharge opening. This stirring rod has a slope and is offset in a rotational direction in such a way that an upward movement of the bulk product is caused, which avoids bridging of the bulk product and/or dissolves existing bridges and ensures the descent.

In a device of this type, the exploitation of the bulk product container is ideal, because the entire container volume may be used for the storage. In contrast to the prior art, baffles, which decrease the volume, do not have to be installed here to prevent the bridging. The discharge occurs in a controlled way, and an avalanche-like discharge is not possible. The discharge of the bulk product occurs independently of the pressure on the rotating disc, by which a uniform discharge is ensured over the entire filling spectrum and the filling height of the container.

An inner wall of the container is preferably to be structured as wavy, by which a descent of the preforms is made easier. In addition, a large opening is provided in the container wall, through which the upper body of a person may reach the interior. She may then easily remove the preforms of a specific series which are still present, before the container is filled with a new, different series.

The products to be discharged also cannot jam between discharge belts and stationary parts, which would otherwise result in interferences.

Very exact and sparing dosing results in particular by the control of the speed of the rotating disc, the dosing being able to be adapted very rapidly and dynamically to changing desires for the bulk product supply.

Furthermore, it results in the achievement of the object that the body of the hollow object at least partially enters a transfer unit, is pneumatically and/or mechanically retained therein, and is drawn or pressed in turn out of the transfer unit by the removal unit.

This means that preforms and PET bottles may be retained securely in the transfer unit completely detached from the supply unit and/or the removal unit, so that in the event of a jam in the removal unit, for example, this transfer unit may be stopped without a jam pressure being built up in the removal unit.

Thanks to the corresponding device, it is possible to relay a preform stream free of jam pressure forces in a defined position to a following unit. The acceptance of a preform stream is also possible using simple components.

Two possibilities are conceivable for the retention of the cylindrical object in or on the transfer unit. On the one hand, this may be performed by a suction pressure which acts on the cylindrical body in a hole, for example, or by a mechanical retention pressure, however.

In particular for preforms, this retention has the advantage in relation to earlier systems that the preforms are not retained on the head and/or the neck ring part, but rather on the defined part of the body. In this way, on the one hand the retention is improved, and on the other hand no deformation of the head part and/or the neck ring part also occurs.

Because the preforms and/or PET bottles are retained on the body during the entire clocking in and transfer procedure, the free view of the object is not restricted during this procedure. This circumstance allows the transfer unit to be combined with further necessary workstations (such as sifter, blower) and, inter alia, thus integrate the work steps in the actual core object (provision of preforms). This is explained in greater detail below.

The retention does not necessarily have to be performed in the transfer unit, but rather the transfer unit may have appropriately implemented troughs on its surface, in which the cylindrical body lies. The pneumatic and/or mechanical retention is to be able to be at least largely canceled out again shortly before the engagement of the removal unit.

Special attention of the invention is directed to the fact that the cylindrical body may also be treated or subjected to visual inspections during its stay in the transfer unit. This may be performed by applying corresponding treatment agent, because the cylindrical body is freely accessible in the transfer unit. For example, a cavity in the cylindrical body may be blown out or sprayed with a treatment agent.

The corresponding device provides, in a first exemplary embodiment, that a cylindrical wheel, which rotates around an axis, is provided with the holes and/or troughs. The holes preferably run from a lateral surface of the wheel radially inward, and they are preferably provided with a step. This step tapers the hole to a diameter which is smaller than the diameter of the cylindrical body. It is ensured in this way that the cylindrical body is not drawn too deeply into the hole. Furthermore, the hole may also solely be designed as conical.

The hole opens in the interior of the wheel into a segmented chamber, which is connected to a vacuum source. The holes are preferably not always connected to the segmented chamber, i.e., they are not connected to the vacuum source during their entire revolution. For this reason, the chamber is also implemented as segmented and as part of an annular chamber, the remaining part not being accessible to the vacuum source. This remaining part closes the holes, so that the vacuum is canceled out therein and the cylindrical bodies may be removed from the hole.

The circumference and/or the extension of the segmented chamber is preferably changeable, so that desires for its extension may be taken into consideration sufficiently. This is performed by a corresponding blocking wing or blocking slider. A general replacement of the elements which form the segmented chamber is also conceivable.

Multiple possibilities are also conceivable for the mechanical retention, only a few of which are to be described in the present case. In one exemplary embodiment, two discs are situated one above another and/or adjacent to one another. The cylindrical object is then accommodated between these two discs, pulled off of the supply unit, and brought to the transfer unit. At least one disc is to be implemented as elastic, so that it may be pressed onto the cylindrical object by a hold-down in a specific area, for example.

In a further exemplary embodiment, it is provided that the discs do not have a shared axis, but rather two separate rotational axes which are inclined at an angle to one another. The clamping force of the two discs is thus not equally large over the entire deflection angle. The cylindrical objects are accommodated softly between the discs and also discharged again softly, but held tightly between these times.

The retention of the cylindrical objects is also improved if at least one, preferably each disc is occupied by an elastic ring on its inner surface. This ring is situated around the rotational axis.

In a further exemplary embodiment of the invention, a plurality of individual leaf springs is situated segmented around the rotational axis over at least one of the discs. In this case, both discs may cohere and form a chamber for accommodating the cylindrical objects between them. The actual retention is assumed by the leaf springs. Similarly as described above for the elastic disc, a hold-down is assigned to the leaf springs in a specific area, which presses the leaf springs downward against the cylindrical object. In this case, one disc acts as a stop disc and delimits the deflection angle for the leaf springs.

In many cases, it may also be desirable if the cylindrical objects are additionally retained by a transport element, which also transports the objects further after the transfer unit, in particular linearly, upon the transfer into the transfer unit. This is caused by a belt which is provided with openings which correspond to the holes in the suction wheel of the transfer unit. This belt wraps around the suction wheel in the transfer unit over the majority of its circumference, so that the cylindrical objects first penetrate through the opening of the belt and then into the holes in the suction wheel. Upon leaving the transfer unit, the cylindrical objects are drawn out of the holes by the belt, but remain in the openings of the belt and are transported further by the belt.

An improved retention of the cylindrical objects is also caused in this exemplary embodiment in that clamping lamellae protrude laterally to the openings from the belt. These have the effect on the one hand that the cylindrical objects do not penetrate too deeply into the holes of the belt. This is further supported in that the cylindrical objects are retained on a neck ring, for example, by corresponding support shells. On the other hand, the angle of the clamping lamellae opens in the area of the wheel, so that the cylindrical objects may be pushed between them. If the corresponding part of the belt then moves further linearly, the opening angle of the lamellae is decreased again and the cylindrical objects are clamped between them and retained in their position.

It is preferably provided that the lateral surface of the wheel is covered by teeth and the belt is implemented as a toothed belt. In this way, the correspondence of the opening of the belt to the holes of the gear wheel is ensured in particular, clocking-in is thus possible.

To be able to counteract jam pressure forces, the transfer unit is connected via a slip clutch to a corresponding drive. The slip clutch is caused in a simple exemplary embodiment in that a round belt is wrapped around the rotational axis of the wheel and/or the disc as a drive belt.

Furthermore, it suggests itself that a unit for treating the objects be assigned and/or situated after the transfer unit. The designs and configurations of treatment units described for the preforms and/or PET bottles only represent exemplary embodiments. Through the free view and the free access described above to the preform head and the preform opening during the clocking-in/transfer procedure, the possibility exists of internally cleaning (blowing out) the preforms and similarly also the PET bottles, of course, using a corresponding treatment unit and thus meeting the growing market requirements. In addition to the cleaning procedure, it is also possible to ionize and/or visually check the objects.

It is also to be noted that any dirt particles on the external envelope of the cylindrical object are also removed by the above-mentioned suction of the cylindrical objects into the suction wheel by the partial vacuum in the radial holes. This prevents such contaminants resulting in a poor surface quality of the PET bottles in the blow molds of the downstream stretch blowing machine.

DESCRIPTION OF THE FIGURES

Further advantages, features, and details of the invention result from the following description of preferred exemplary embodiments and on the basis of the drawing; in the figures of the drawing

FIG. 10 shows a perspective view of a device according to the invention for the transfer of objects having a cylindrical body from a supply unit to a removal unit;

Figure 1:
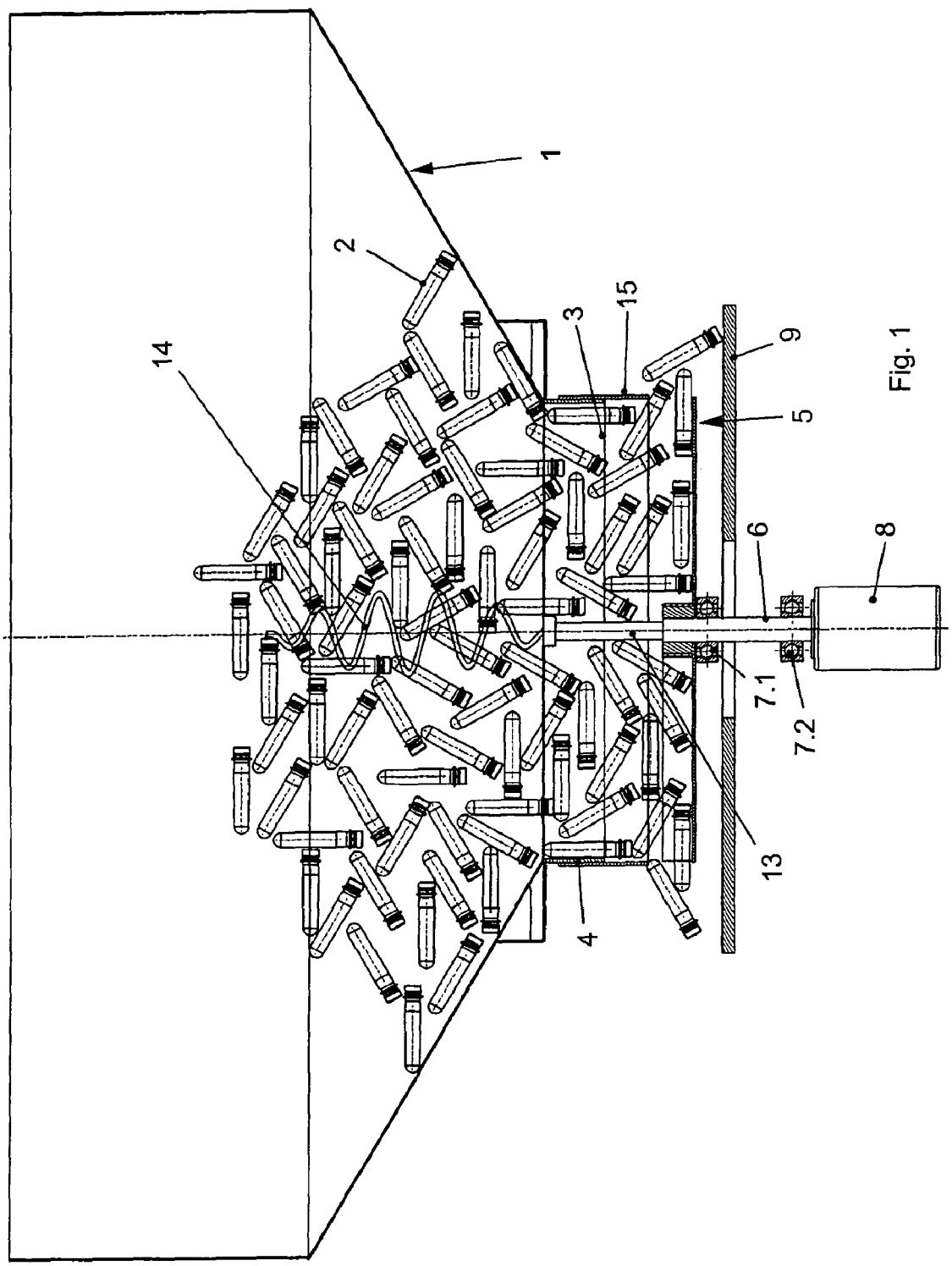
FIG. 1 shows a cross-section through a device according to the invention for discharging elongate, coarse bulk products from a container.

According to FIG. 1, a plurality of preforms 2, which are to be discharged through a discharge opening 3, are located disorganized in a bulk product hopper 1. A connecting piece 4 of the bulk product hopper 1 surrounds this discharge opening 3.

A disc 5, which is seated on a rotating shaft 6, is situated below the discharge opening 3. The rotating shaft 6 rotates in two bearings and 7.1 and 7.2 and is connected to a drive 8. Moreover, the rotating shaft 6 is enclosed without play by a distributing surface 9, which is also implemented as disc-shaped, for example.

Superstructures, which are shown in greater detail in FIGS. 6 through 9 in particular, are placed on one surface 10 of the disc 5. According to FIGS. 6 and 8, the superstructures are linear wall strips 11, which are situated eccentrically to a center point M of the disc 5. In contrast, curved wall strips 12 are placed on the surface 10 of the disc 5 according to FIGS. 7 and 9, the curvature of these wall strips 12 trailing a rotational direction z of the disc 5.

It is indicated in FIG. 1 that the disc 5 is seated rotationally fixed on the rotating shaft 6. An extension 13 adjoins the rotating shaft 6, in which a twisted stirring rod 14 is inserted on its front face. This twisted stirring rod 14 forms an expanding and tapering bulge between its two ends.

Figure 3:
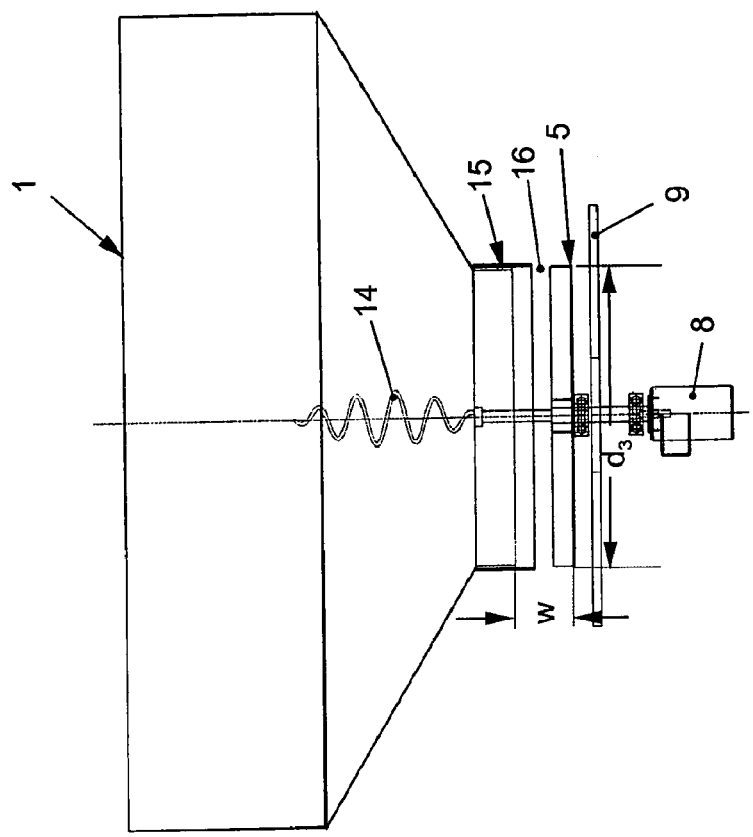
FIG. 3 shows a side view of the device according to FIG. 2 in a further usage position.
Figure 2:
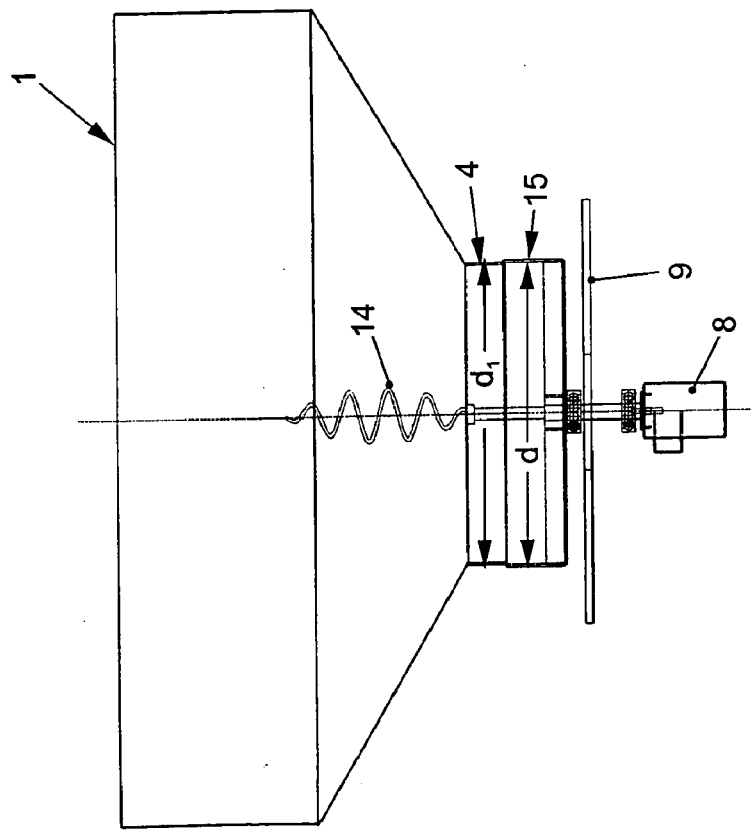
FIG. 2 shows a side view, illustrated smaller, of the device according to FIG. 1.

Furthermore, according to the invention, a screen 15 which is displaceable along the connecting piece 4 is to be placed on the connecting piece 4. The screen 15 has a somewhat greater diameter d than the diameter $d_1$ of the connecting piece 4 (see FIG. 2). The discharge opening 3 has a diameter $d_2$, this not being very different from a diameter $d_3$ of the disc 5 (see FIG. 3). By displacing the screen 15 along the connecting piece 4, as shown in FIGS. 2 and 3, a vertical opening width w of an annular opening 16 between connecting piece 4 and disc 5 is changed.

Figure 5:
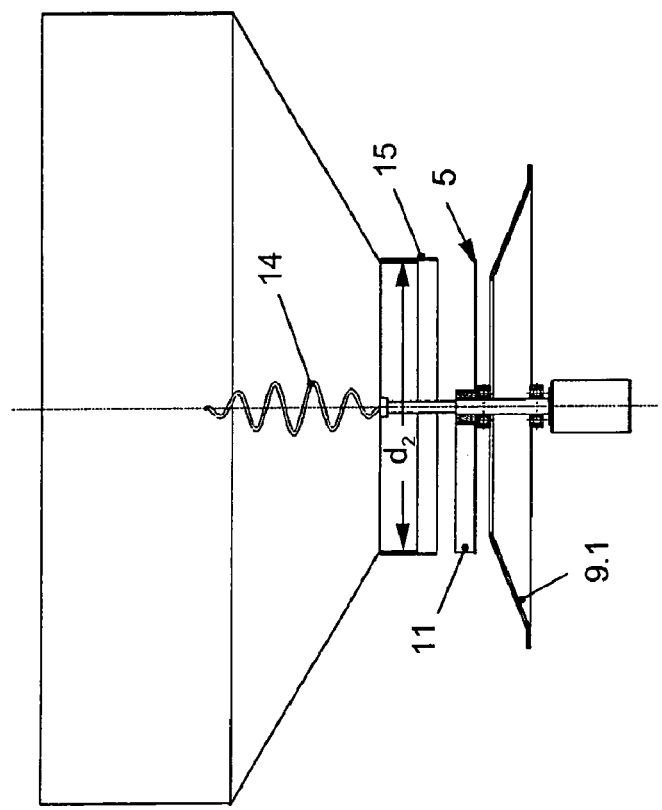
FIG. 5 shows a cross-section through the device according to FIG. 4 along line V-V.
Figure 4:
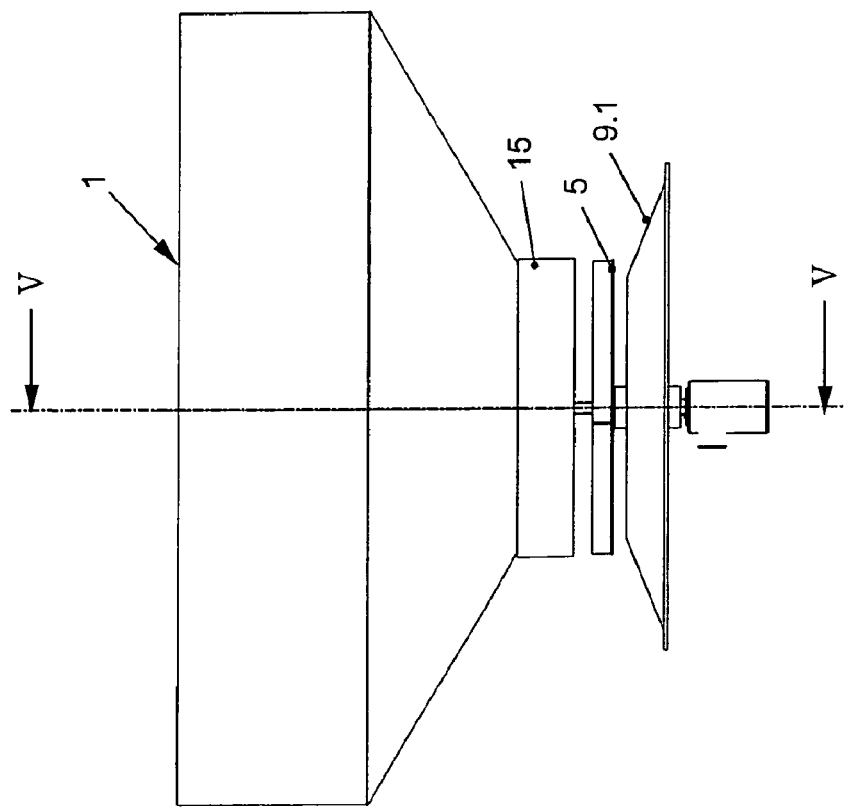
FIG. 4 shows a side view of a further exemplary embodiment of a device according to FIG. 1.
Figure 7:
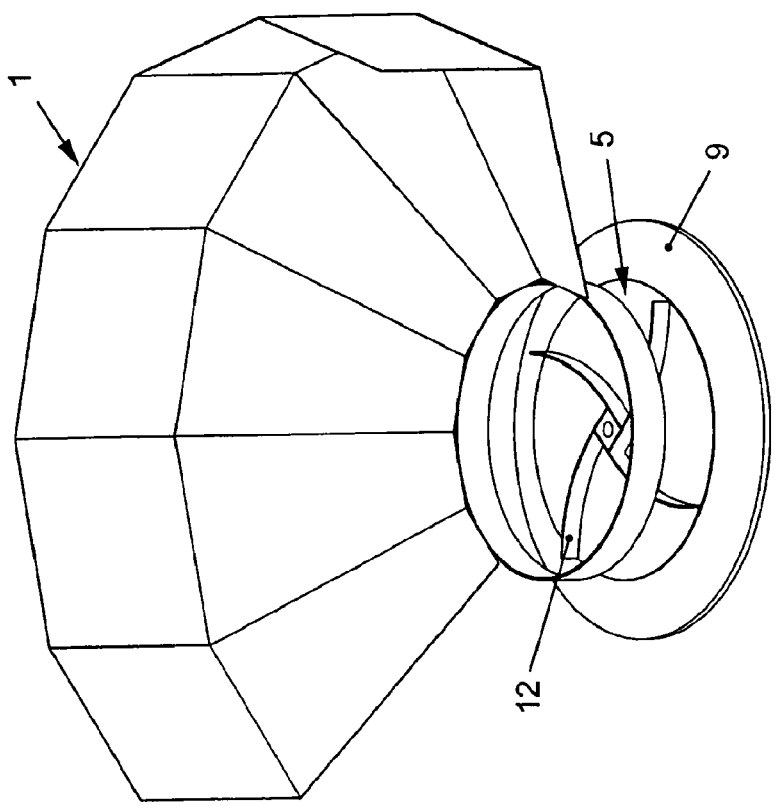
FIG. 7 shows a perspective view of a partially open device according to FIG. 1 in a further exemplary embodiment.
Figure 6:
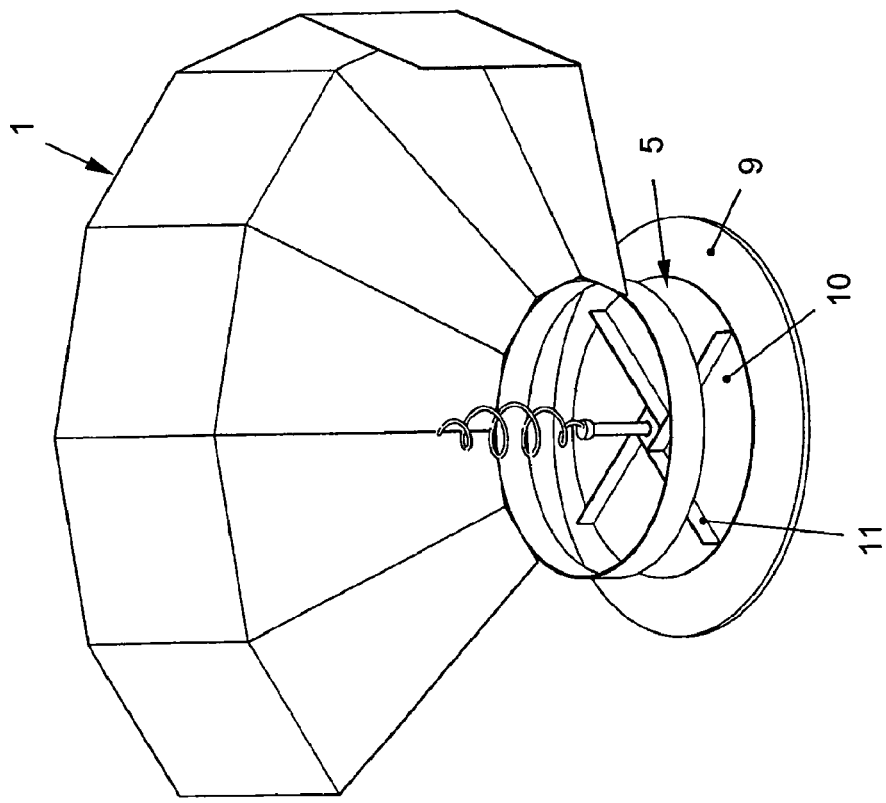
FIG. 6 shows a perspective view of a part of an open device according to FIG. 1.
Figure 9:
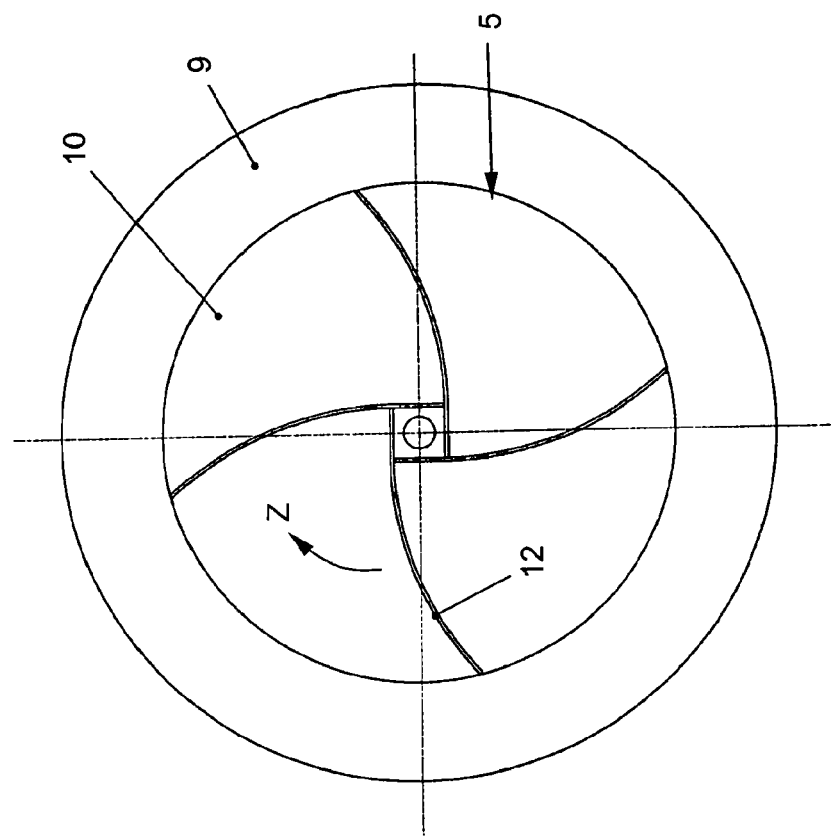
FIG. 9 shows a top view of a further exemplary embodiment of a disc according to the invention.
Figure 8:
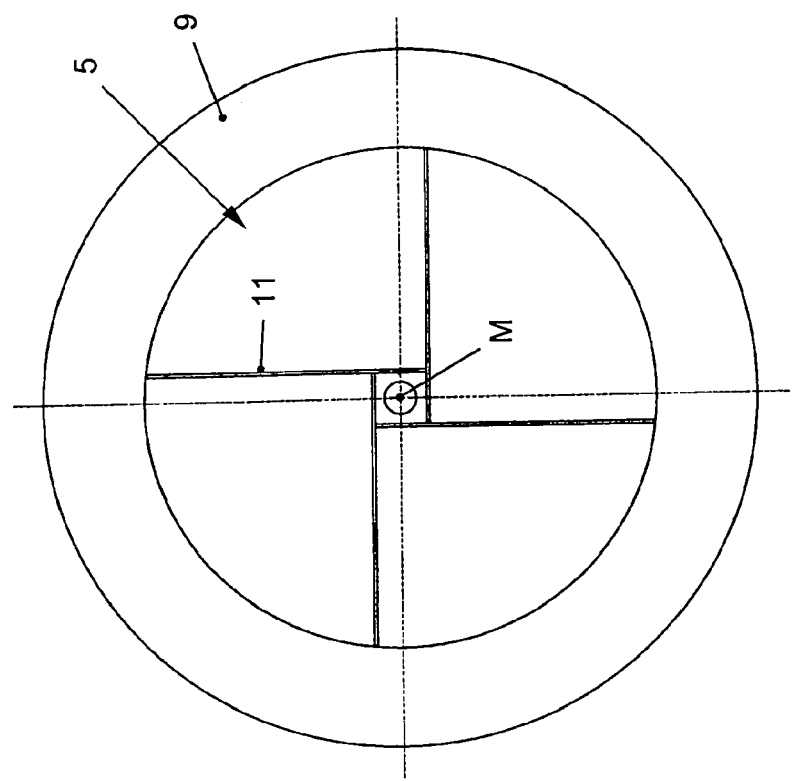
FIG. 8 shows a top view of an exemplary embodiment of a disc according to the invention.

FIGS. 4 and 5 show that the distributing surface does not necessarily have to be implemented as flat, but rather may also be a spherical section surface 9.1.

The mode of operation of the present invention is as follows:

Preforms 2 reach the bulk product hopper 1 as a bulk product from a device (not shown in greater detail) for producing these preforms. The preforms 2 are to be discharged and distributed from this bulk product hopper 1, for example, using a device as described in EP 05100893.6. A distributing surface 9 and/or a spherical section surface 9.1, which may possibly rotate, is used for the distribution.

For orderly discharge, the disc 5 is set into rotational movement in the rotational direction z, which is caused by the drive 8. The rotating shaft 6 rotates around its central axis.

During the rotation of the disc 5, preforms are engaged, moved, rotated, etc. by the wall strips 11 and/or 12 until they rest on the surface 10 of the disc 5. Upon the rotation of the disc 5, the preforms then travel outward along the wall strips 11 and/or 12 and fall through the annular opening 16 onto the distributing surface 9 and/or the spherical section surface 9.1. This traveling is also supported if the wall strips 12 are implemented as curved trailing the rotational direction z, because then a lower speed is also sufficient for the preforms 2 to run outward. This is also true for the eccentric configuration of the linear wall strips 11. The quantity of the preforms to be discharged may be controlled very precisely by a speed change of the rotating disc. A maximum speed also indicates a maximum exit quantity. If the speed is 0, no preforms are discharged, and the exit is more or less blocked.

The size of the annular opening 16 is changed by displacing the screen 15 along the connecting piece 4. For short preforms, the opening width of the annular opening 16 is decreased. For longer preforms or thicker preforms, it is enlarged.

In addition to the discharge of the preforms, the rotating disc 5 causes a softly rotating dynamic column made of preforms, which propagates up into the interior of the bulk product hopper 1 and ensures the descent of the preforms. Experiments with preforms have shown that significantly larger and taller containers may also be built using this type of discharge than was possible until now, and the discharge and the descent are equally good even with very large filling quantities and filling levels.

If problems occur upon the descent into the connecting piece 4 with bulk products, an auxiliary unit suggests itself. This is a stirring finger which engages in the bulk product hopper 1. It is preferably a twisted stirring rod which is connected to the rotating shaft of the drive 8, for example. An upward movement of the bulk product is caused by the slope of the stirring finger and the matching rotational direction, by which bridging of the bulk product is loosened and a descent is ensured, for example.

Figure 11:
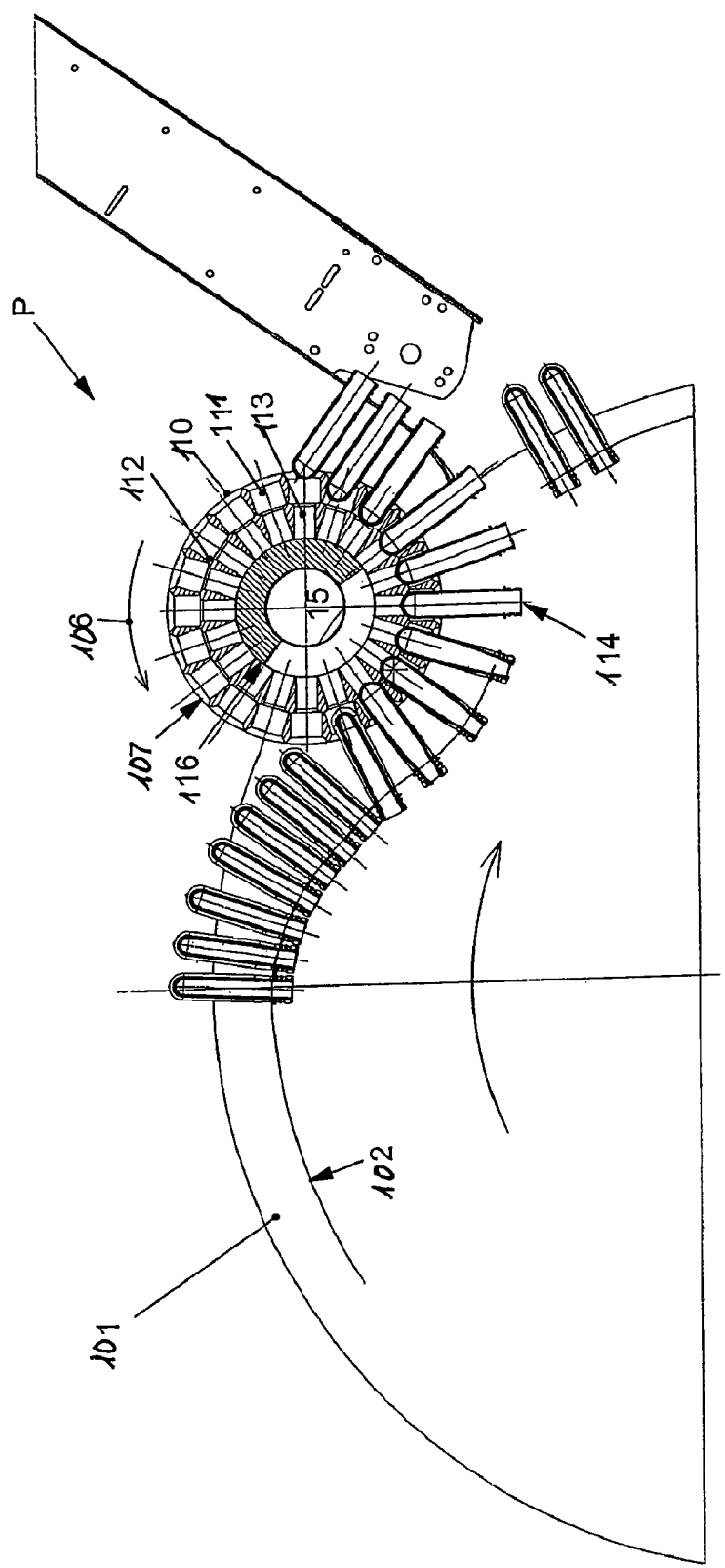
FIG. 11 shows a horizontal section through the device according to FIG. 10.

A first exemplary embodiment of a device P according to the invention for the transfer of cylindrical bodies, in this case preforms, is shown in FIGS. 10 and 11. In this case, a transfer unit 104 is located between a supply unit 102 and a removal unit 103 above a rotating disc 101, as described in PCT/EP2006/008772. This transfer unit 104 is implemented as a suction wheel which rotates around an axis 105. The rotational direction is indicated by the arrow 106.

The suction wheel 107 has an external lateral surface 108, in which a plurality of holes 109 is molded. These holes 109 run radially from the lateral surface 108 into the interior of the wheel 107, as is recognizable in FIG. 11. Each hole 109 has an opening 110, implemented as approximately oval, which is adjoined by a receptacle chamber 111, which passes into a hole section 113 after a step 112. This hole section 113 has a diameter which is less than that of the receptacle chamber 111 and less than a diameter of a preform 114.

A stationary chamber 115 like a circular segment is located in the interior of the wheel 107, which is connected to a vacuum source (not shown in greater detail). The chamber 115 like a circular segment is part of an annular chamber 116 around which the suction wheel 107 rotates, the remaining part of the annular chamber 116 being closed, however, and not being connected to the vacuum source.

The mode of operation of the present invention is as follows:

The preforms are isolated on the disc 101 and removed by the supply unit 102, as described in PCT/EP2006/008772. As soon as they reach the area of the rotating transfer unit 104, the ends of the preforms 114 are accommodated by the holes 109, which is made easier by the oval design of the opening 110. The accommodation occurs in an area in which the holes 109 are connected to the segmented chamber 115, i.e., to the vacuum source. The preforms 114 are held under suction pressure in this way and the end may now reach the supply unit, at which the preforms 114 are released. Following this, they are held in a formfitting and/or nonpositive way in the holes 109.

After a further rotation, the preforms 114 reach the area of the removal unit 103, in which they are in turn accommodated by corresponding rail strips below their neck ring 117. The holes 109 simultaneously enter the closed area of the annular chamber 116 from the area of the segmented chamber 115, so that there is no longer a connection to a vacuum source and the preforms 114 are released. The step 112 in the hole 109 ensures that the preforms are only sucked into the hole 109 to a defined depth, so that the area of the preform protruding out of the hole always has the same length. A secure transfer to the removal unit is made possible in this way.

Figure 12:
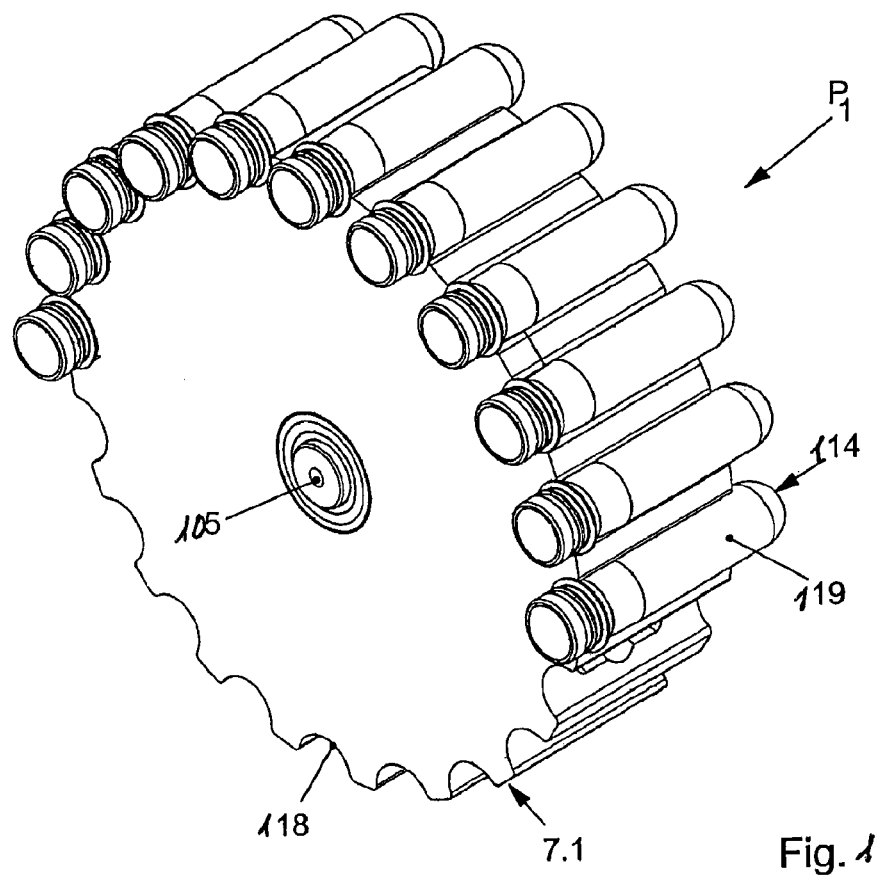
FIG. 12 shows a perspective view of a part of the device according to the invention in a further embodiment.
Figure 13:
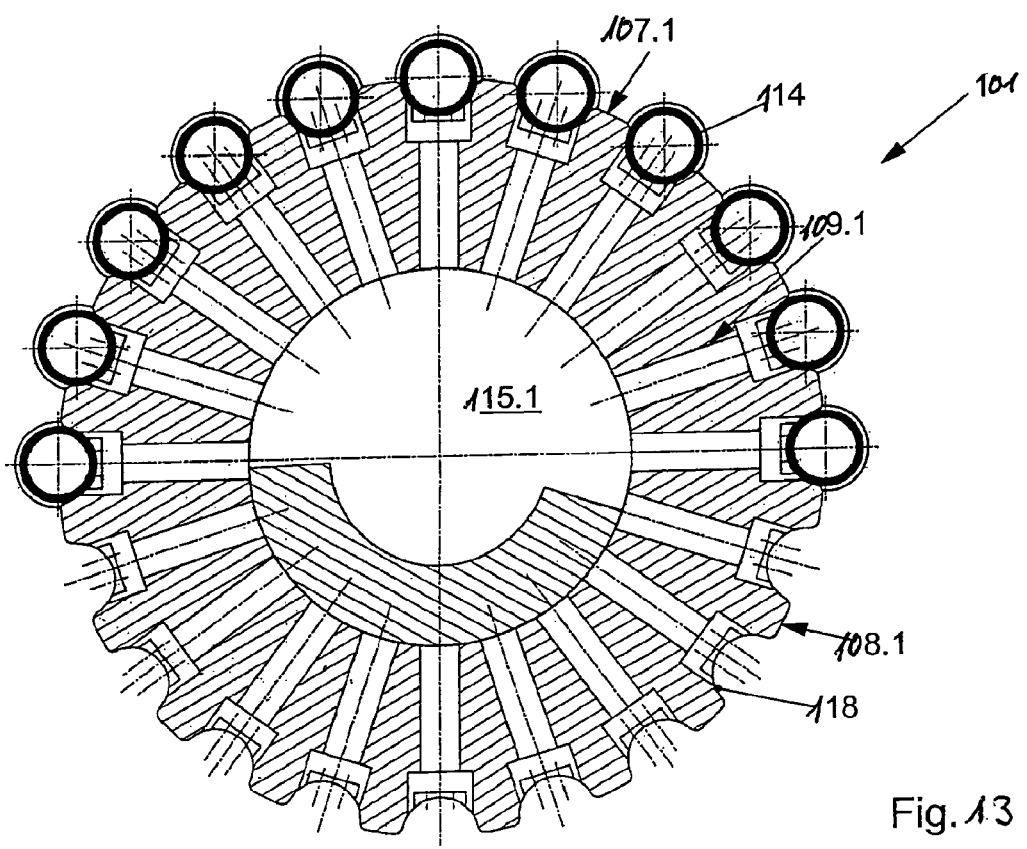
FIG. 13 shows a horizontal section through the part of the device according to FIG. 12.

In a further embodiment of a device P1 according to the invention as shown in FIGS. 12 and 13, a plurality of troughs 118 are molded into a lateral surface 108.1 of a wheel 107.1, which run approximately parallel to the axis 105 and are used to accommodate a majority of the lateral surface 119 of the preform. In this case, holes 109.1 are not used for accommodating the preforms 114, but rather only for applying a vacuum. For this purpose, the holes 109.1 are connectable to a chamber 115.1, the chamber 115.1 being connected to a vacuum source.

Figure 14:
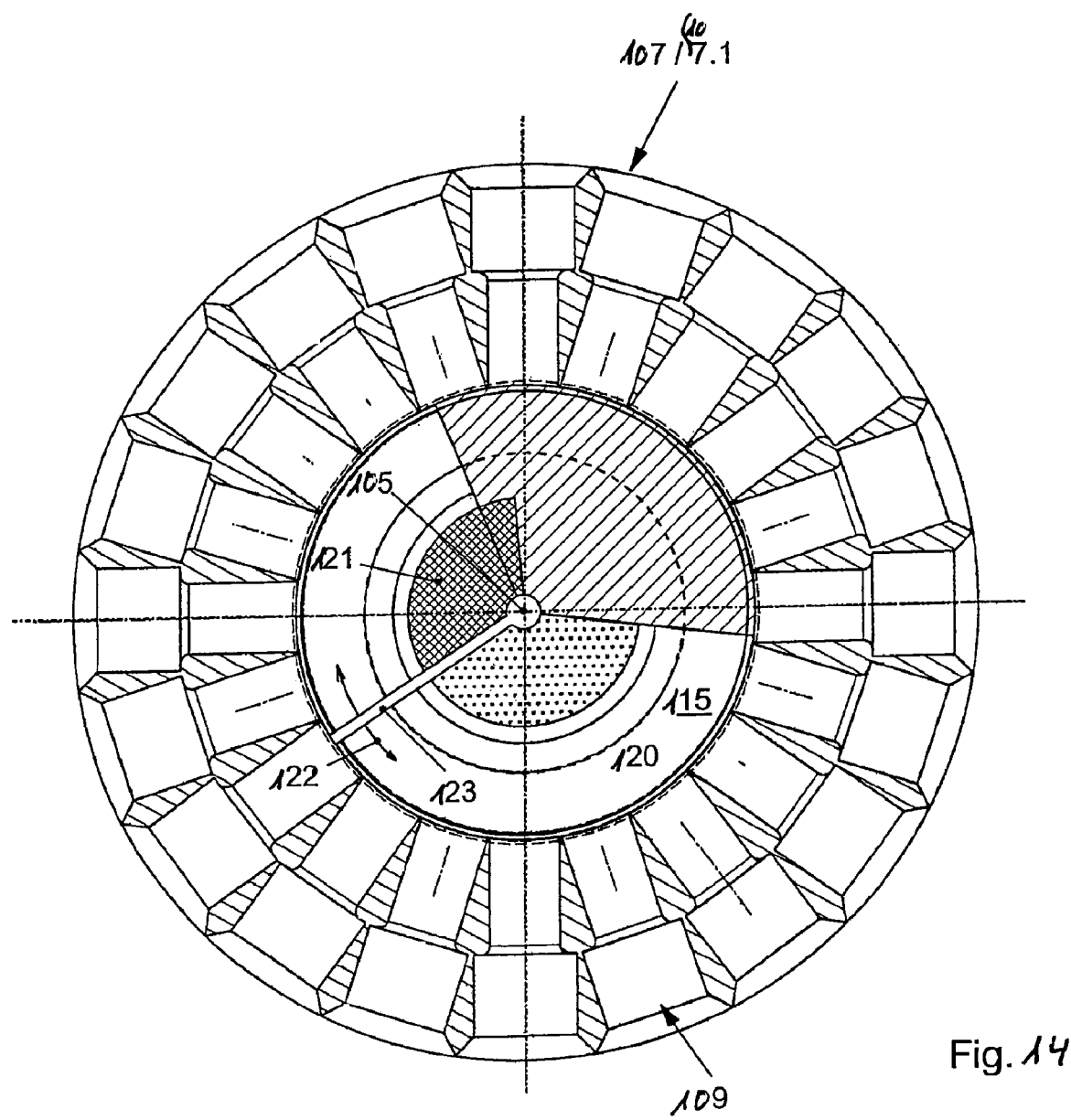
FIG. 14 shows a horizontal section through a further exemplary embodiment of a suction wheel.

The capability of adjusting the chamber 115 within the annular chamber 116 in a defined way and thus assigning the vacuum to the desired holes 109 in a suitable way is shown in FIG. 14. The chamber 115, which simultaneously forms the partial vacuum area, is opened to the vacuum area by sliding openings 120, a blocking wing 121, which closes this sliding opening 120 as desired, being able to rotate around the axis 105. The rotational ability is indicated by a double arrow 122, a wall 123 of the chamber 115 and a shutoff floor of the blocking wing 121 also being moved.

Figure 15:
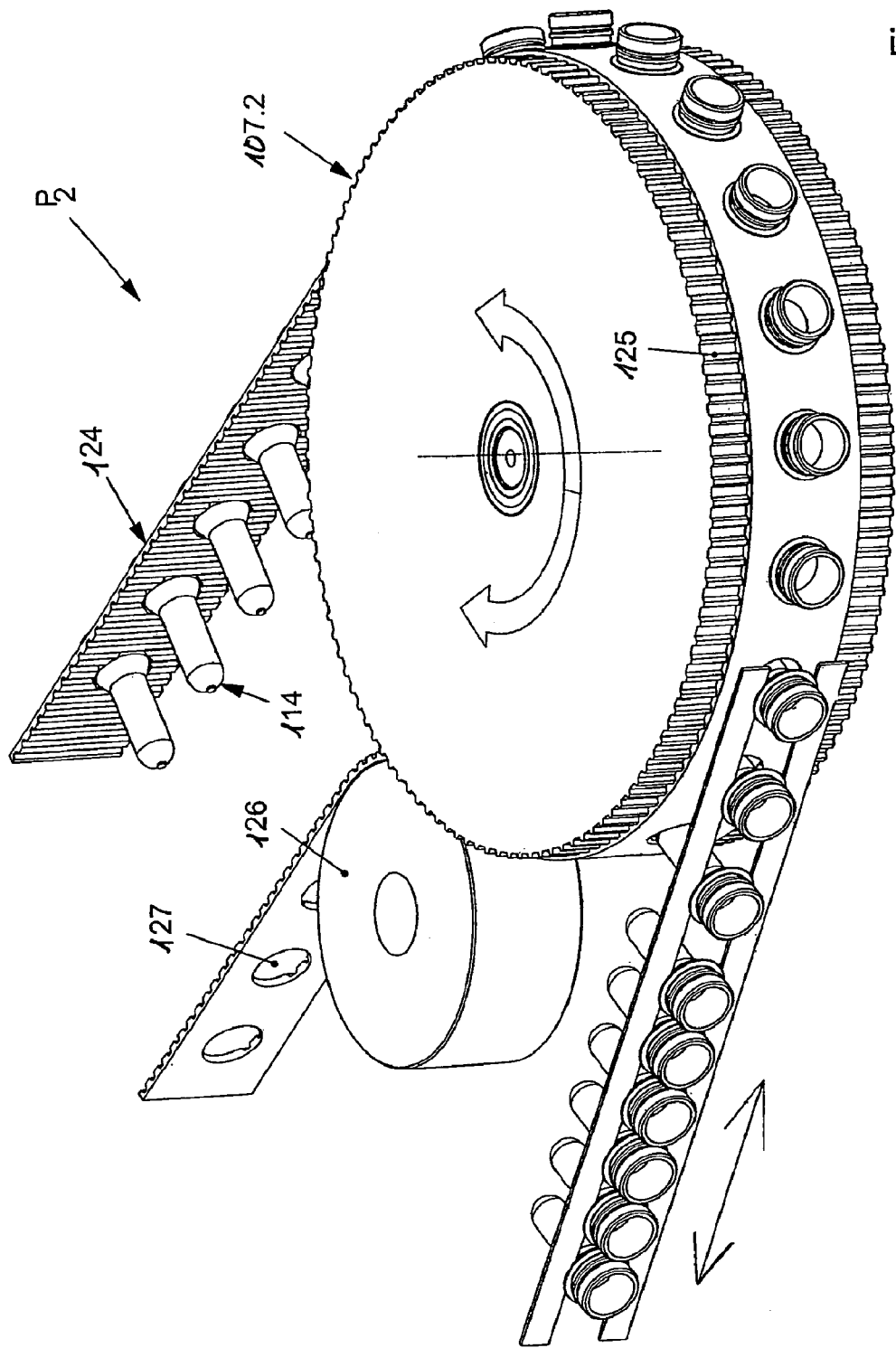
FIG. 15 shows a perspective view of a further exemplary embodiment of a device according to the invention corresponding to FIG. 10.
Figure 16:
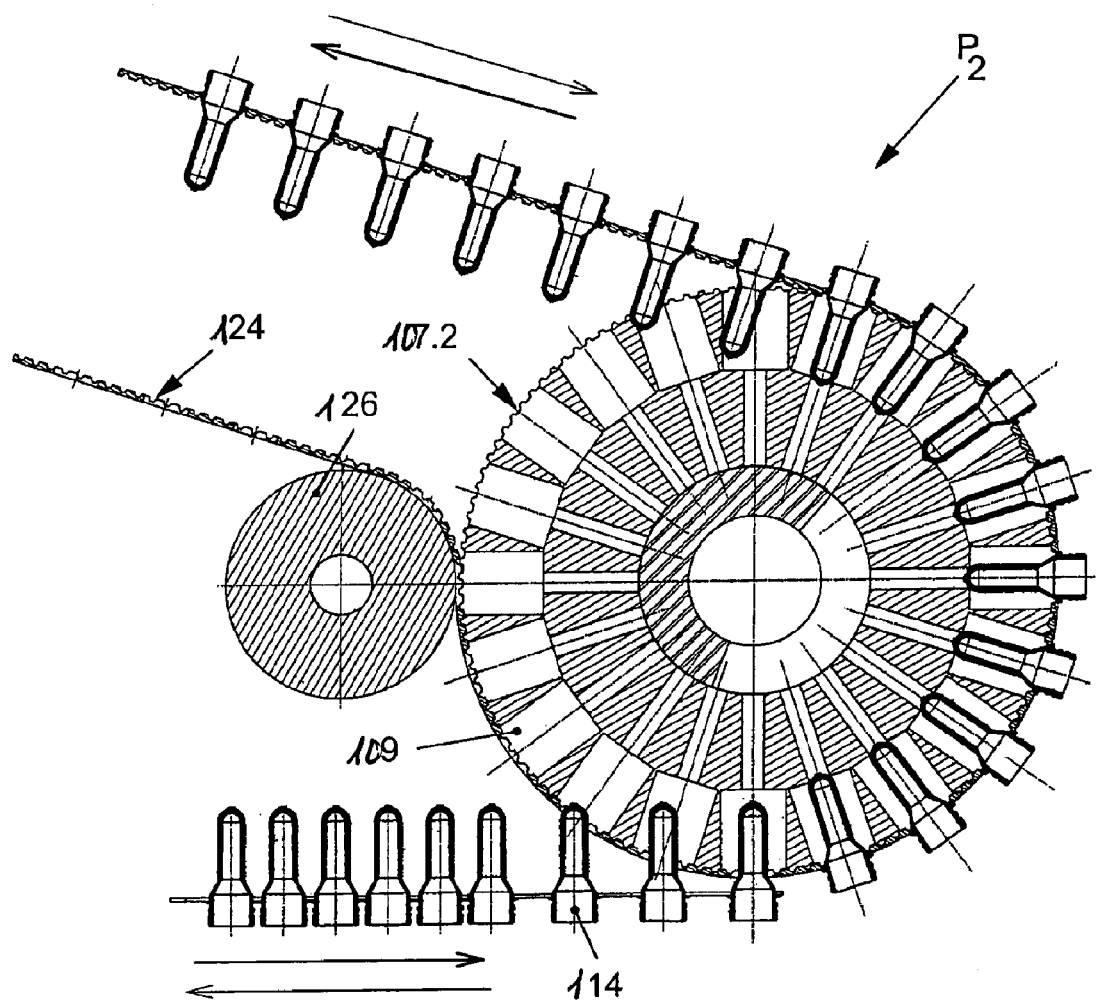
FIG. 16 shows a horizontal section through the exemplary embodiment of the device according to FIG. 15.

According to FIGS. 15 and 16, in a further device P2 for the transfer of cylindrical bodies, a toothed belt 24 partially wraps around a suction wheel 107.2. This toothed belt 124 works together with teeth 125, which are molded into the lateral surface of the suction wheel 107.2. A support roll 126 ensures a timely application of the toothed belt 124 on the toothed lateral surface of the wheel 107.2. Openings 127 are molded into the toothed belt 124, which align with the holes 109 after the application of the toothed belt 124 on the suction wheel 107.2.

This exemplary embodiment has the advantage that the preforms 114 are drawn by the toothed belt 124 out of the holes 109 upon leaving the transfer unit, i.e., the wheel 107.2. They also do not have to be immediately transferred to a removal unit 103, but rather may still remain in the openings 127 of the toothed belt 124 over an arbitrary distance. For example, the preforms 114 may be subjected to a treatment therein, as will be described later.

Figure 17:
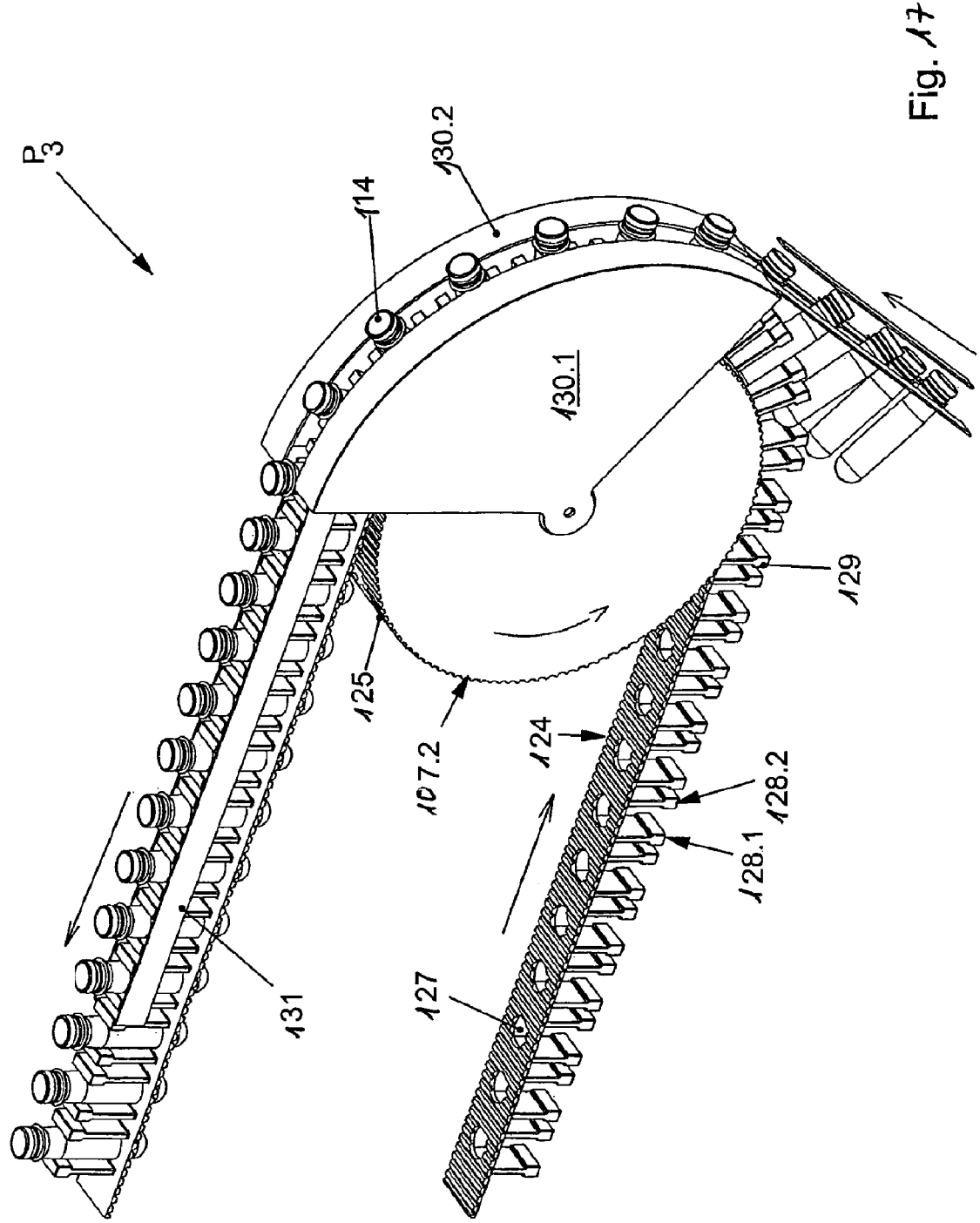
FIG. 17 shows a perspective view of a further exemplary embodiment of a device corresponding to FIG. 10.
Figure 18:
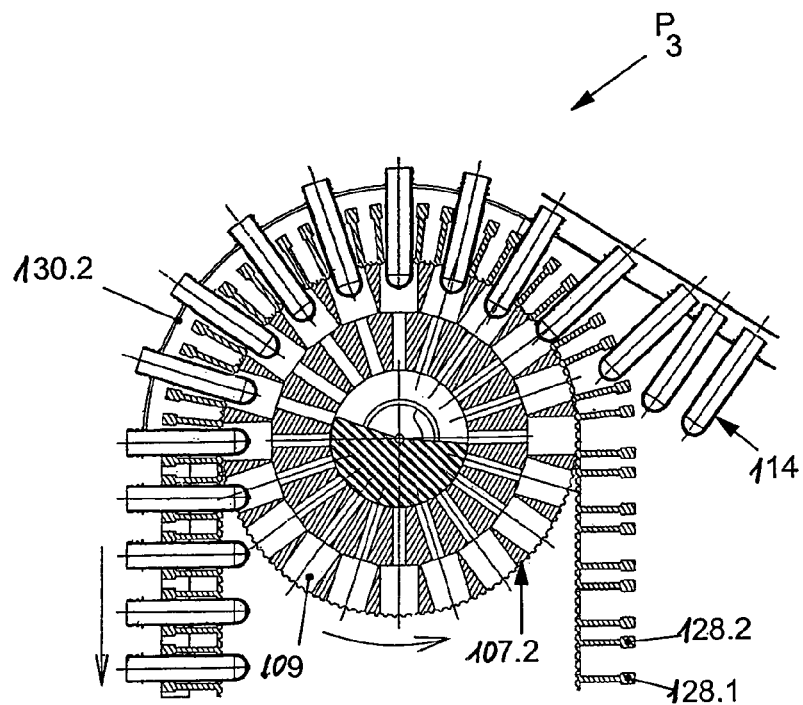
FIG. 18 shows a horizontal section through the exemplary embodiment of the device according to the invention according to FIG. 17.

An improved embodiment of the exemplary embodiment just described is described in FIGS. 17 and 18. The device P3 according to the invention shown here for the transfer of cylindrical bodies has clamping lamellae adjacent to the openings 127 in the toothed belt 124, each two clamping lamellae 128.1 and 128.2 accommodating a preform 114 between them. To further improve the clamping action, the clamping lamellae 128.1 and 128.2 each have a thickened head strip 129.

If the toothed belt 124 is guided around the suction wheel 107.2 having the teeth 125, the angle of the clamping lamellae 128.1 and 128.2 opens and the preforms may be pushed between the clamping lamellae. If the corresponding part of the belt 124 again moves linearly, the opening angle of the lamellae is decreased and the preforms are clamped between them.

Two support shells 130.1 and 130.2 as well as corresponding support strips 131 after them are used to improve the guiding of the preforms 114 in the transfer area. In particular the support shells engage below the neck ring of the preforms and thus prevent the preforms from being sucked too deep into the holes.

Figure 19:
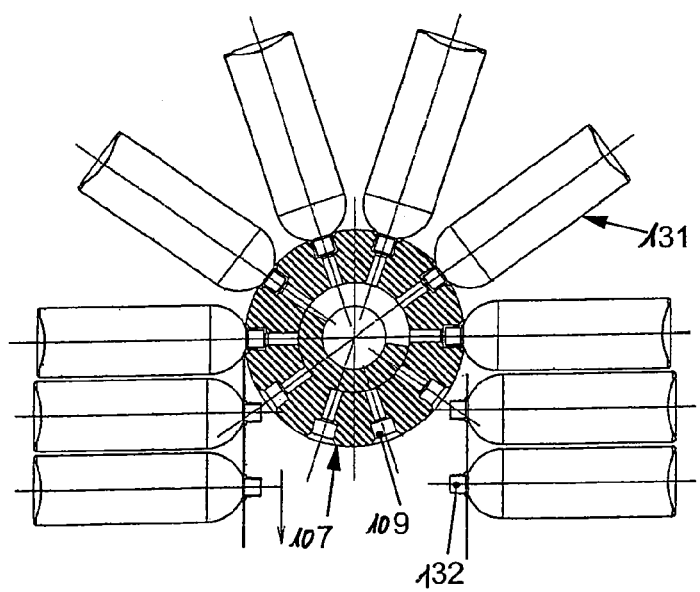
FIG. 19 shows a horizontal section through a part of the device corresponding to FIG. 11, but having different objects.

It is indicated in FIG. 19 that the cylindrical body, a bottle 131 here, may also have its opening area accommodated by the hole 109 of the wheel 107. In this case, the bottle 131 has its neck 132 inserted into the hole 109. The bottle 131, with appropriate size of the hole, may also be accommodated via its floor part in the hole 109.

Figure 20:
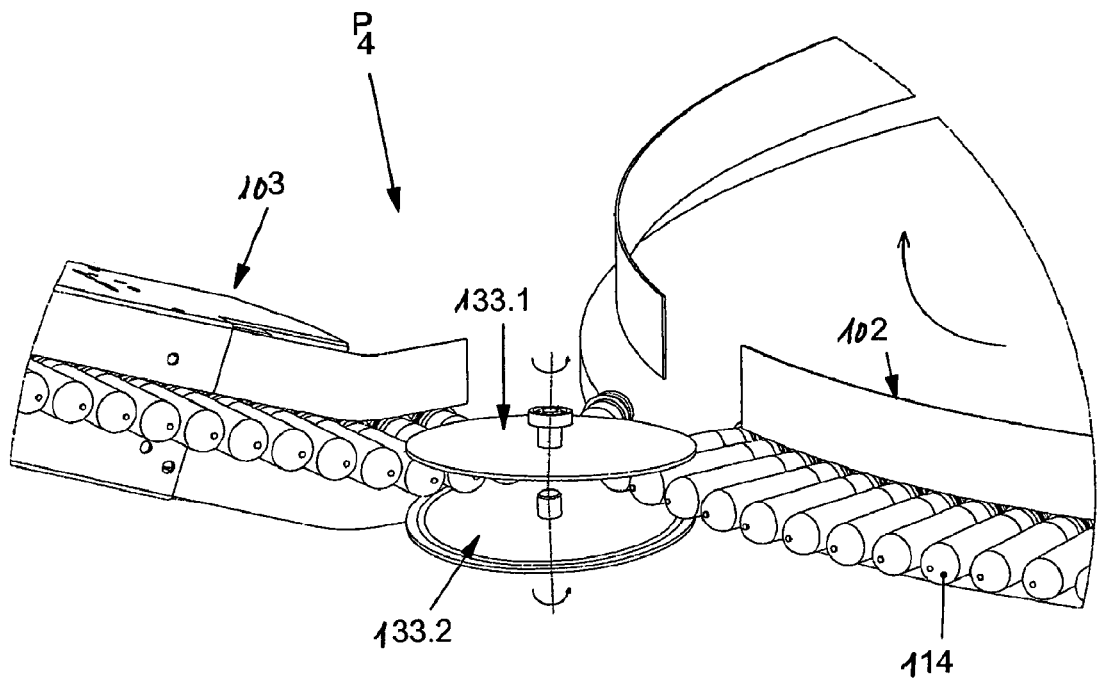
FIG. 20 shows a perspective view of a further exemplary embodiment of the device according to the invention corresponding to FIG. 10.
Figure 21:
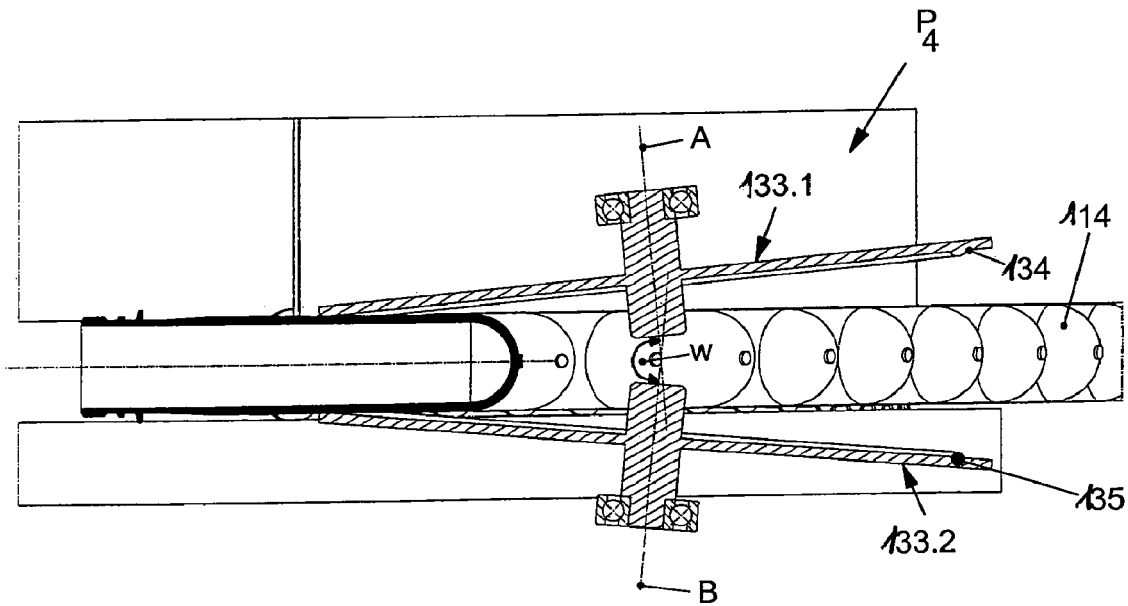
FIG. 21 shows a section through the device according to FIG. 20.

A further exemplary embodiment of a device P4 for the transfer of cylindrical bodies is shown in FIGS. 20 and 21. The corresponding transfer unit has two discs 133.1 and 133.2, which typically each rotate synchronously around a rotational axis A and B. The rotational axes A and B do not run axially, but rather at angle w to one another. This means that the two discs 133.1 and 133.2 run diagonally to one another, so that they maintain the least spacing to one another during the clamping of the preform. As a result of this diagonal position and/or the angle of the two discs to one another, the clamping force is not equally great over the entire deflection angle. The preforms are accommodated softly between the discs 133.1 and 133.2 and also discharged softly again, but held tightly between these times. The two discs themselves are preferably implemented as elastic and/or their inner faces 134 are occupied by an elastic ring 135.

Figure 22:
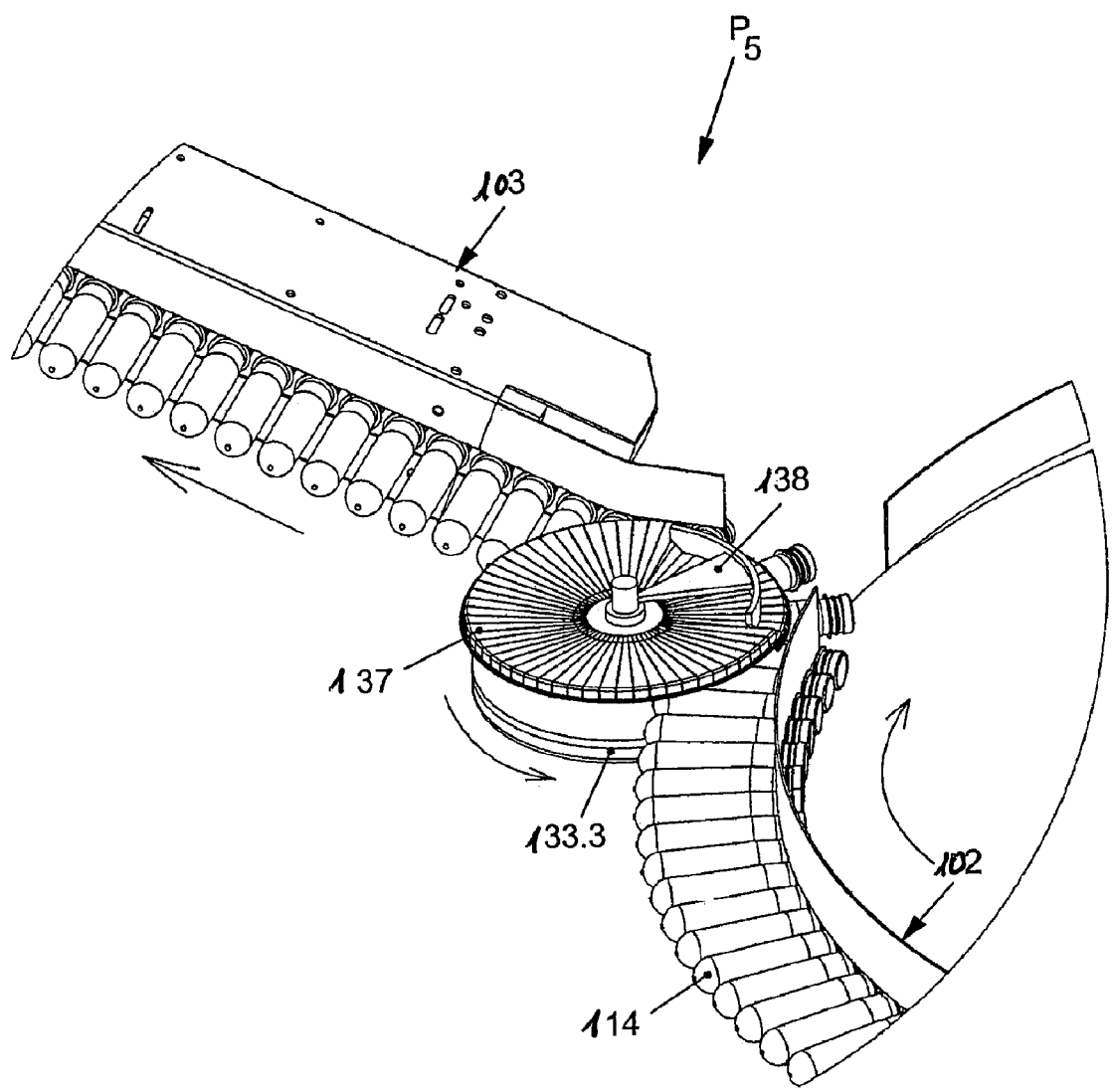
FIG. 22 shows a perspective view of a further exemplary embodiment of a device according to the invention according to FIG. 10.
Figure 23:
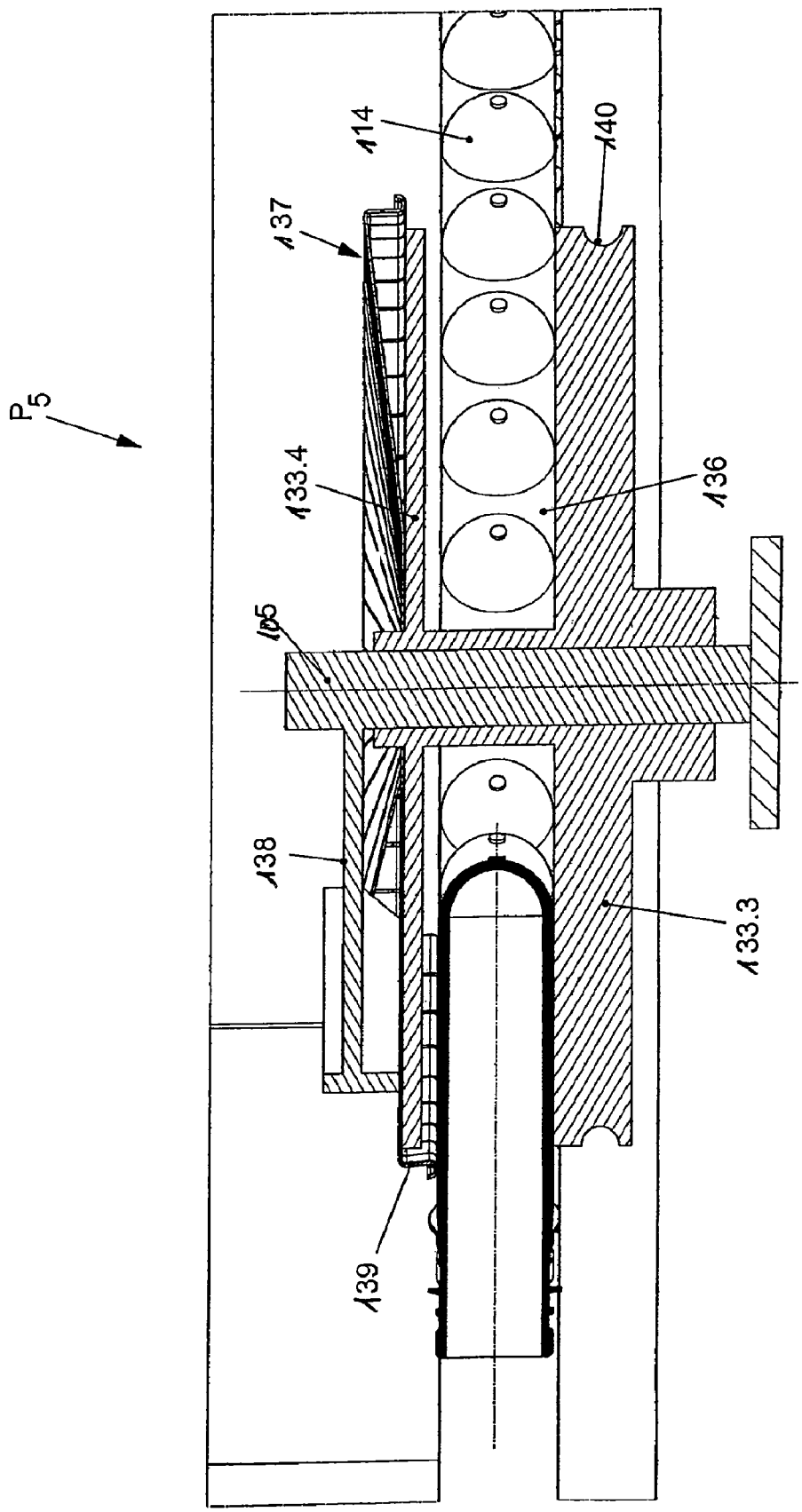
FIG. 23 shows a section through the device according to FIG. 22.

A further exemplary embodiment of a device P5 according to the invention for the transfer of cylindrical bodies is shown in FIGS. 22 and 23. It differs from the embodiment described above in that two discs 133.3 and 133.4 are connected to one another so they are rotatable and rotate around the axis 105. They form an annular chamber 136 between them, which is used to accommodate the preforms 114. However, the height of the annular chamber 136 is greater than the body diameter of the preform 114, so that additional clamping elements must be provided. These are leaf springs 137, which rotate together with the upper disc 133.4 and in this way with the entire configuration around the axis 105. Upon this rotation, the leaf springs 137 enter the area of a fixed hold-down 138, which presses the leaf springs downward until they rest on the disc 133.4. A clamping angle 139 of the leaf springs 127 overlaps the disc 133.4 and presses on the preforms 114.

The drive for the transfer unit 104 is particularly also recognizable in FIG. 23. A channel 140 is molded into the circumference of the lower disc 133.3 here, which is used to accommodate a corresponding round belt. This round belt is connected to a motor. For example, if the preforms are jammed in the removal unit and this occurs back to the transfer unit, this connection between round belt and disc 133.3 acts as a slip clutch, so that no further preforms are delivered.

Figure 24:
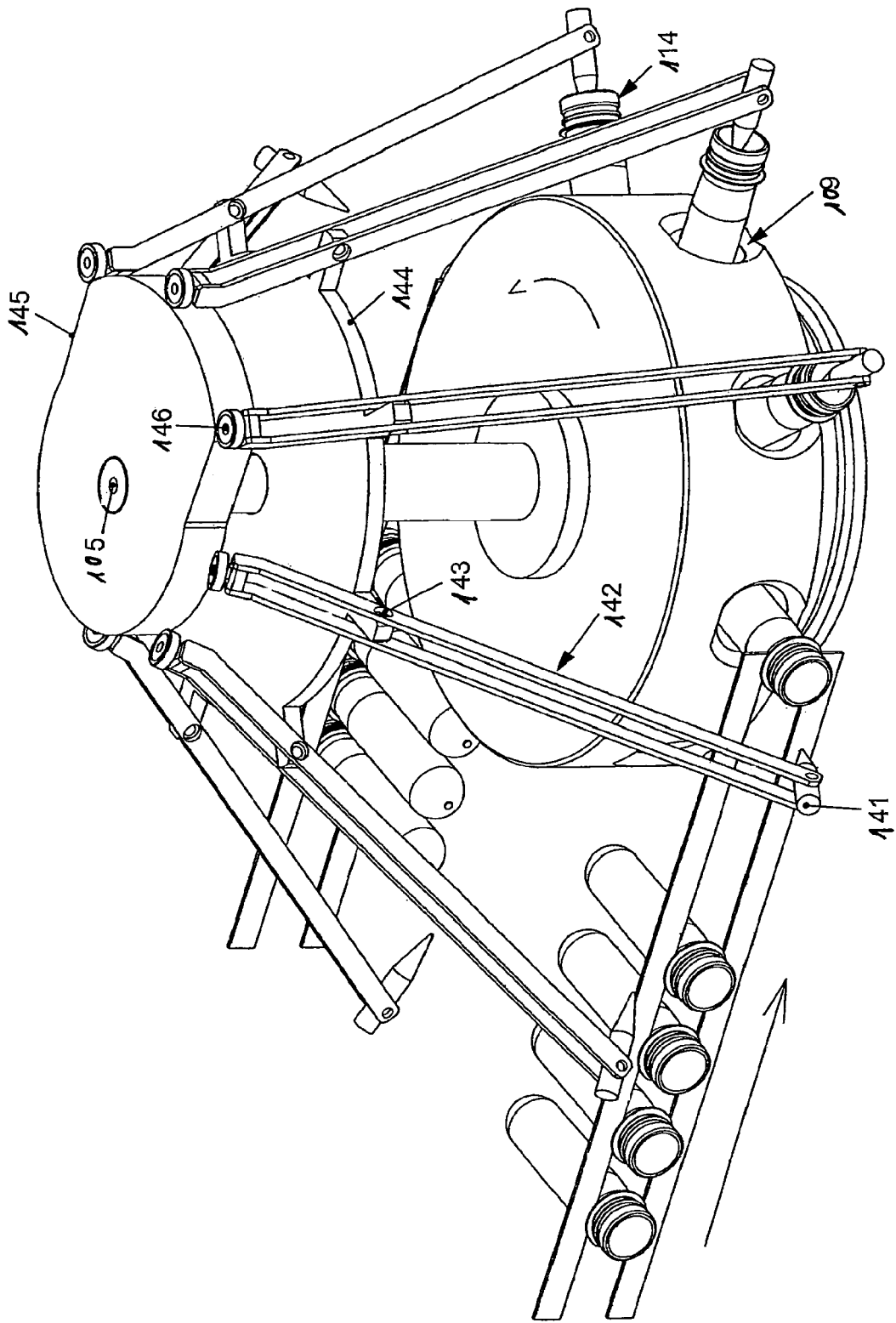
FIG. 24 shows a perspective view of a further possible configuration step in the area of the intake wheel.

A further idea of the present invention relates to treating the body in or after the transfer unit 104 or performing visual checks using cameras. This is shown in an exemplary embodiment in FIG. 24. A treatment unit 141, which may be implemented, for example, as a nozzle for introducing ionized air or the like into the inner chamber of the preform 114, rotates with the preform 114 located in the holes 109. The treatment unit 141 is located on an arm 142 which is connected via a pivot bearing 143 to a rotating disc 144. The arm 142 rotates together with the rotating disc 144 around the axis 105, a link disc 145 being seated fixed on the axis 105, against which a wheel 146 is supported, which is provided on the other free end of the arm 142 opposite to the treatment unit 141. This link disc 145 is designed in such a way that the treatment unit 141 may be inserted into the cavity of the preform 114 and/or pivoted out of the cavity as desired.

Figure 25:
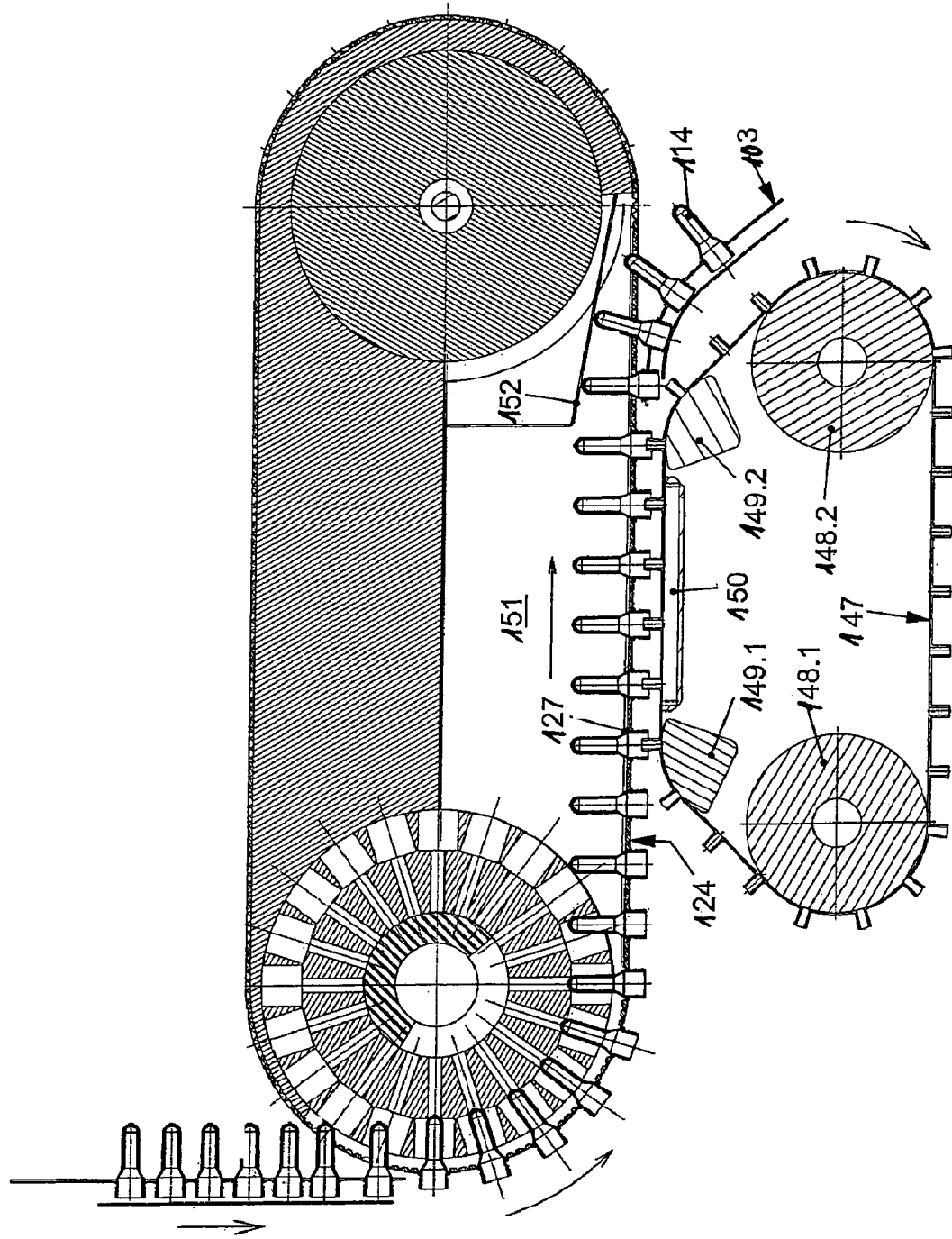
FIG. 25 shows a sectional illustration of a further configuration step of the device according to the invention having a treatment unit.

In a further exemplary embodiment of a posttreatment of the preform according to FIG. 25, treatment units 141.1 are located on an endless belt having teeth 147, which revolves around two deflection rollers 148.1 and 148.2 and is guided against the preform 114 by two support segments 149.1 and 149.2. A pressure chamber 150, which may be impinged with ionized air, for example, which is then injected through the nozzles 141.1 into the cavity of the preform 114, is located between the support segments 149.1 and 149.2. The toothed belts 127 and 147 run synchronously to one another.

The preforms 114 are located here, as noted above on FIG. 16, in the openings of a toothed belt 124, which passes through a partial vacuum area 151, so that the preforms 114 are retained in the openings 127 of the toothed belt 124. After their treatment, they are mechanically ejected out of the openings 127 by a guide strip 152 and transferred to a removal unit 103. It may be recognized especially clearly in this embodiment that the possibility also exists of retaining the preforms in an overhead position by the prevailing partial vacuum in the toothed belt 124.

The invention claimed is:

1. A device for discharging elongate, bulk products, the device comprising:
    a product hopper including a discharge opening;
    a rotating disc configured to receive said bulk products passing through the discharge opening; and
    a screen provided between the discharge opening and the rotating disc, wherein the screen engages with a connecting piece and the discharge opening is enclosed by the connecting piece.

2. The device according to claim 1, wherein the diameter of the rotating disc approximately corresponds to the diameter of the discharge opening.

3. The device according to claim 1, wherein the rotational speed of the rotating disc is variable.

4. The device according to claim 1, wherein the rotating disc includes an upper surface, and the device includes wall formations provided upon the upper surface; the wall formations extending in an upward direction toward the discharge opening and being configured for rotation.

5. The device according to claim 4, wherein the wall formations comprise eccentrically situated wall straps.

6. The device according to claim 4, wherein the wall formations are configured to trail in the rotational direction.

7. The device according to claim 1, wherein the rotating disc is provided above a distributing surface.

8. The device according to claim 1, including a movable stirring rod or finger configured to extend through the discharge opening into the product hopper.

9. The device according to claim 8, wherein the stirring rod or finger is in operative connection with a rotating shaft.

10. The device according to claim 9, wherein the rotating disc is also in operative connection with the rotating shaft.

11. The device according to claim 1, wherein a rotary drive is provided in connection with the rotating disc.

12. A device for discharging elongate, bulk products, the device comprising:
   a product hopper including a discharge opening;
   a rotating disc configured to receive said bulk products passing through the discharge opening; and
   a movable stirring rod configured to extend through the discharge opening into the product hopper, wherein the stirring rod is in operative connection with a rotating shaft.

13. The device according to claim 12, wherein a screen is provided between the discharge opening and the rotating disc.

14. The device according to claim 13, wherein the screen comprises a ring with a diameter that is equal to or greater than the diameter of the discharge opening.

15. The device according to claim 13, wherein the screen is vertically displaceable between the discharge opening and the rotating disc.

16. The device according to claim 15, wherein the vertical positioning of the screen changes the width of an annular opening provided between the discharge opening and the rotating disc.

17. The device according to claim 13, wherein the screen is engaged with a connecting piece and the discharge opening is enclosed by the connecting piece.

18. A device for discharging elongate, bulk products, the device comprising:
   a product hopper including a discharge opening;
   a rotating disc configured to receive said bulk products passing through the discharge opening, the rotational speed of the rotating disc being variable;
   a plurality of wall formations provided upon an upper surface of the rotating disc, the wall formations extending in an upward direction toward the discharge opening and being configured for rotation; and
   a screen is provided between the discharge opening and the rotating disc, the screen configured to be vertically displaceable between the discharge opening and the rotating disc, such that changes in the vertical positioning of the screen results in changes in the width of an annular opening provided between the discharge opening and the rotating disc, wherein the screen engages a connecting piece and the discharge opening is enclosed by the connecting piece.

19. The device according to claim 18, wherein the screen comprises a ring with a diameter that is equal to or greater than the diameter of the discharge opening.

20. The device according to claim 18, including a distributing surface provided below the rotating disc.

21. The device according to claim 18, including a movable stirring rod or finger configured to extend through the discharge opening into the product hopper.

22. The device according to claim 21, including a rotating shaft, wherein the stirring rod or finger is in operative connection with the rotating shaft.

23. The device according to claim 22, wherein the rotating disc is also in operative connection with the rotating shaft.

24. The device according to claim 18, wherein a rotary drive is provided in connection with the rotating disc.

25. A device for discharging elongate, bulk products, the device comprising:
   a product hopper including a discharge opening;
   a rotating disc configured to receive said bulk products passing through the discharge opening, the rotational speed of the rotating disc being variable;
   a plurality of wall formations provided upon an upper surface of the rotating disc, the wall formations extending in an upward direction toward the discharge opening and being configured for rotation;
   a screen is provided between the discharge opening and the rotating disc, the screen configured to be vertically displaceable between the discharge opening and the rotating disc, such that changes in the vertical positioning of the screen results in changes in the width of an annular opening provided between the discharge opening and the rotating disc; and
   a movable stirring rod configured to extend through the discharge opening into the product hopper, wherein the stirring rod is in operative connection with a rotating shaft.

26. The device according to claim 25, wherein the screen is engaged with a connecting piece and the discharge opening is enclosed by the connecting piece.

* * * * *